(12) United States Patent
Walters et al.

(10) Patent No.: US 7,079,548 B1
(45) Date of Patent: Jul. 18, 2006

(54) SIMULATED LOW-BANDWIDTH CONNECTION

(75) Inventors: Glen R. Walters, Hollywood, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 09/299,309

(22) Filed: Apr. 26, 1999

(51) Int. Cl.
*H04L 12/66* (2006.01)

(52) U.S. Cl. .................... 370/468; 370/401; 370/477

(58) Field of Classification Search ............... 370/465, 370/468, 477, 401; 703/13, 20, 21, 22; 379/26.01, 379/26.02, 93.01, 93.33
See application file for complete search history.

(56) References Cited

U.S. PATENT DOCUMENTS 6,208,640 B1 * 3/2001 Spell et al. ................. 370/358

OTHER PUBLICATIONS

"IP Technology Product Testing: How to Evaluate IP based product robustness and performance over changing network conditions". SHUNRA Software, Ltd. Document Created Feb. 16, 1999. pp. 1-19.*
Carson, Mark. "Application and Protocol Testing Through Network Emulation". Internetworking Technologies Group, NIST. Sep., 1997. Slides 1-20.*
Carson, Mark. "NIST Net (network emulator) beta available". Netdev news group nuclecu.unam.mx. Jan. 23, 1998.*
Terai et al. "Design and Implemention Experiments of Scalable Socket Buffer Tuning". Document created Aug. 1, 2001. Section 3.2 and figure 3.*
Jones, Frank. "Internet Basics". IEEE ELECTRO. Apr. 30-May 2, 1996. pp. 155-189.*
The Packeteer Technical Forum. "Controlling TCP/IP Bandwidth". Updated Nov., 1998. Packeteer, Inc. pp. 3-14.*

(Continued)

*Primary Examiner*—Derrick Ferris
(74) *Attorney, Agent, or Firm*—Richard A. Tomlin; Stephen Bongini; Fleit, Kain, Gibbons, Gutman, Bongini & Bianco P.L.

(57) ABSTRACT

A method of simulating a low-bandwidth connection over a higher-bandwidth connection. According to the method, data is received from a first device at a first predetermined speed, and the data is transferred to a second device over the high-bandwidth connection at a second predetermined speed. The second predetermined speed is less than the first predetermined speed and less than the speed of the high-bandwidth connection. In one preferred method, the data is transferred over a high-bandwidth LAN and the second predetermined speed is the speed of a modem connection. A computer system is also provided. The computer system includes a first device, a second device, and a speed control layer. The speed control layer is coupled between the first and second devices, and slows data transfer from the first device to the second device over a connection to a first predetermined speed that is less than the normal speed of the connection. In a preferred embodiment, the speed control layer includes an interface that is used to set the first predetermined speed.

24 Claims, 2 Drawing Sheets

OTHER PUBLICATIONS

The Packeteer Technical Forum. "Shaping Traffic Behavior". Updated Nov., 1998. Packeteer, Inc. pp. 15-22.*
The Packeteer Technical Forum. "Managing UDP Traffic". Updated Nov., 1998. Packeteer, Inc. pp. 23-26.*

Garroppo et al. "A teletraffic analysis of dial-up connections over PSTN". IEEE Global Telecommunications. Nov. 12, 1998. pp. 1190-1195.*

* cited by examiner

SIMULATED LOW-BANDWIDTH CONNECTION

BACKGROUND OF THE INVENTION

1. Field of the Invention

The present invention relates to computer systems, and more specifically to a method and apparatus for simulating a low-bandwidth connection over a higher-bandwidth connection.

2. Description of Related Art

As computing power and computer memory have become more affordable, local area computer networks (LANs) have largely displaced mainframes and minicomputers as a business platform. Further, large and dispersed public networks such as the Internet have been created and expanded throughout the world. While computers that are directly connected to the Internet or a LAN receive data at a high speed through a high-bandwidth connection, the typical home computer receives data at a much lower speed through a low-bandwidth connection. For example, while a LAN can currently transfer data to a directly connected client computer at 16 Mbps, the expense of such connections effectively limits home computers to a transfer speed of 128 kbps through an ISDN line and the vast majority of home computers connect through a modem at rates such as 56 kbps and 28.8 kbps.

Programmers that develop network centric software for use by home computer users typically work on high speed LANs to boost productivity. However, many of the home users targeted by the software have network connections in the 28.8 kbps range, as explained above. Thus, a common problem for the network program developers is a failure to be able to properly simulate the experience the end user has when using the software over the network. In particular, while the developers understand that a 28.8 kbps connection speed is generally adequate for surfing the Internet and running Java applets, the network centric code that is developed is seldom tested by the developer in the user's 28.8 kbps environment. Therefore, the developers never actually experience their software from the viewpoint of a typical user.

This common situation has lead to many problems. First, programs that work quite well on LANs sometimes fail entirely when accessed over a low speed connection. For example, large applets can take so long to load that the user thinks the browser has crashed and closes the browser window. Likewise, with a point and click graphical user interface (GUI), if the actual connection speed is not properly accounted for the end user can get out of sync with what the GUI is doing. If the user clicks on an icon and nothing happens in a short time, he assumes the program has stopped responding. Further, an animation that looks normal at the developer's LAN connection speed can be difficult to recognize and understand at the user's modem speeds.

One way for a developer to experience the user's viewpoint is to use another computer that is connected to the network through an actual modem. However, this is seldom done primarily due to the fact that it is often impractical for security and hardware reasons to provide telephone or other low speed connections to the developer's LANs. In a work environment, additional hardware and analog phone lines can be difficult for the developer to obtain. Further, allowing phone line access can expose the developer's LAN to access by ill-intentioned third parties.

SUMMARY OF THE INVENTION

In view of these drawbacks, it is an object of the present invention to remove the above-mentioned drawbacks and to provide a simulated low-bandwidth connection over a higher-bandwidth connection. A speed control layer is placed between two devices. The speed control layer adjusts the speed at which data is transferred from one device to the other. Therefore, a developer can easily experience the program being developed from the standpoint of a typical user.

Another object of the present invention is to provide a method for simulating any speed connection on a faster network.

Yet another object of the present invention is to provide simulated low-bandwidth access in parallel with high-bandwidth access on the same computer system.

One embodiment of the present invention provides a method of simulating a low-bandwidth connection over a higher-bandwidth connection. According to the method, data is received from a first device at a first predetermined speed, and the data is transferred to a second device over the high-bandwidth connection at a second predetermined speed. The second predetermined speed is less than the first predetermined speed and less than the speed of the high-bandwidth connection. In one preferred method, the data is transferred over a high-bandwidth LAN and the second predetermined speed is the speed of a modem connection.

Another embodiment of the present invention provides a computer system that includes a first device, a second device, and a speed control layer. The speed control layer is coupled between the first and second devices, and slows data transfer from the first device to the second device over a connection to a first predetermined speed that is less than the normal speed of the connection. In a preferred embodiment, the speed control layer includes an interface that is used to set the first predetermined speed.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
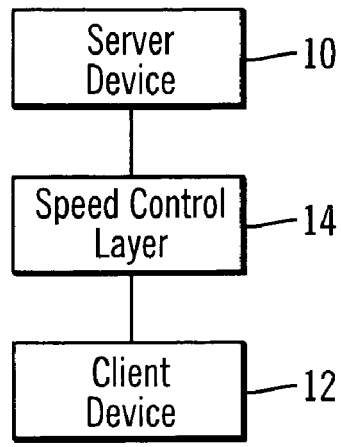
FIG. 1 is a block diagram showing two devices coupled together through a speed control layer in accordance with one embodiment of the present invention.

FIG. 1 shows a system that includes a speed control layer in accordance with one embodiment of the present invention. The system includes a first device such as server device 10 and a second device such as client device 12. Additionally, a speed control layer (or device) 14 is used to couple the server device 10 to the client device 12. The speed control layer 14 can be set (e.g., through physical controls or a GUI) to limit the maximum data transfer speed between the two devices in one or both directions. During operation, the speed control layer inserts a delay to limit the data transfer speed to the selected limit. Thus, a low-bandwidth connection environment (e.g., a 28.8 kbps environment) can be simulated over a high-bandwidth connection.

Figure 2:
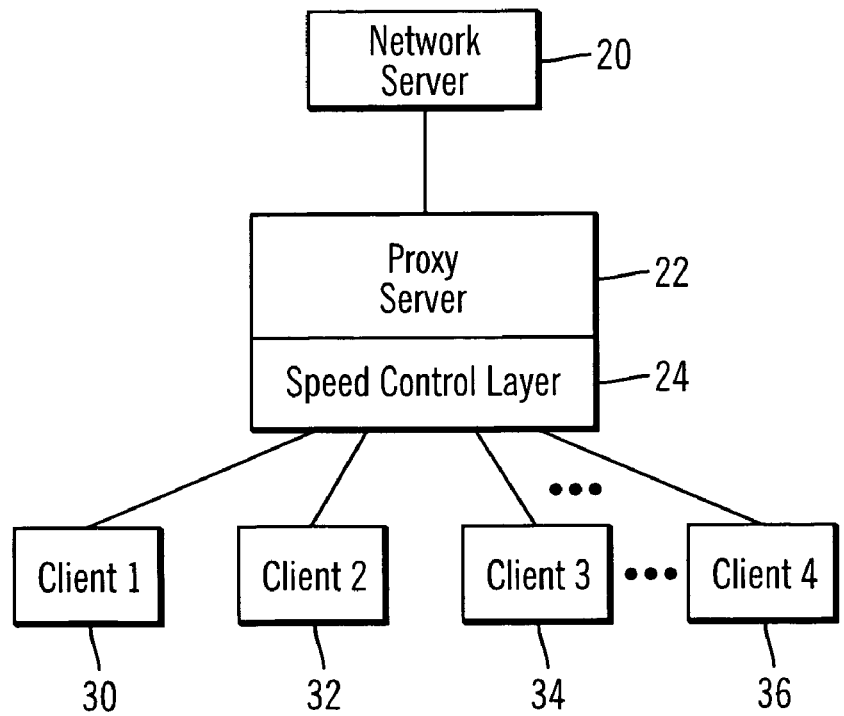
FIG. 2 is a block diagram showing a computer network that includes a speed control layer according to a preferred embodiment of the present invention.

A computer network that includes a speed control layer according to a preferred embodiment of the present invention is shown in FIG. 2. A proxy server 22 is used to connect a network server 20 to various client computers 30, 32, 34, and 36. When one of the client computers (e.g., 30) wants to connect to the network server 20, the client 30 connects to the proxy server 22. The network server's address and port number are passed to the proxy server 22 via a proxy protocol, and the proxy server 22 then connects to the network server 20. After the connection to the network server 20 is established, the proxy server 22 relays data between the client 30 and the network server 20. Thus, from the network server's perspective, the proxy server 22 appears as the client and the actual clients 30 are hidden. In other words, the proxy server provides a single point of access for external traffic.

In the preferred embodiment, the proxy server 22 is a SOCKS server. The SOCKS protocol is a popular firewall protocol having two current versions (i.e., versions 4 and 5). The SOCKS server 22 includes a speed control layer 24 that can restrain specific data streams that pass through the server to a set speed. To SOCKS-enabled applications such as Netscape Navigator and Microsoft Internet Explorer, the SOCKS server 22 having the speed control layer 24 appears as a conventional SOCKS server. Thus, such applications pass all requests through the SOCKS server 22. However, unlike a conventional SOCKS server, the speed control layer 24 can be used to adjust the speed at which data flows through the SOCKS server 22 of FIG. 2.

Figure 3:
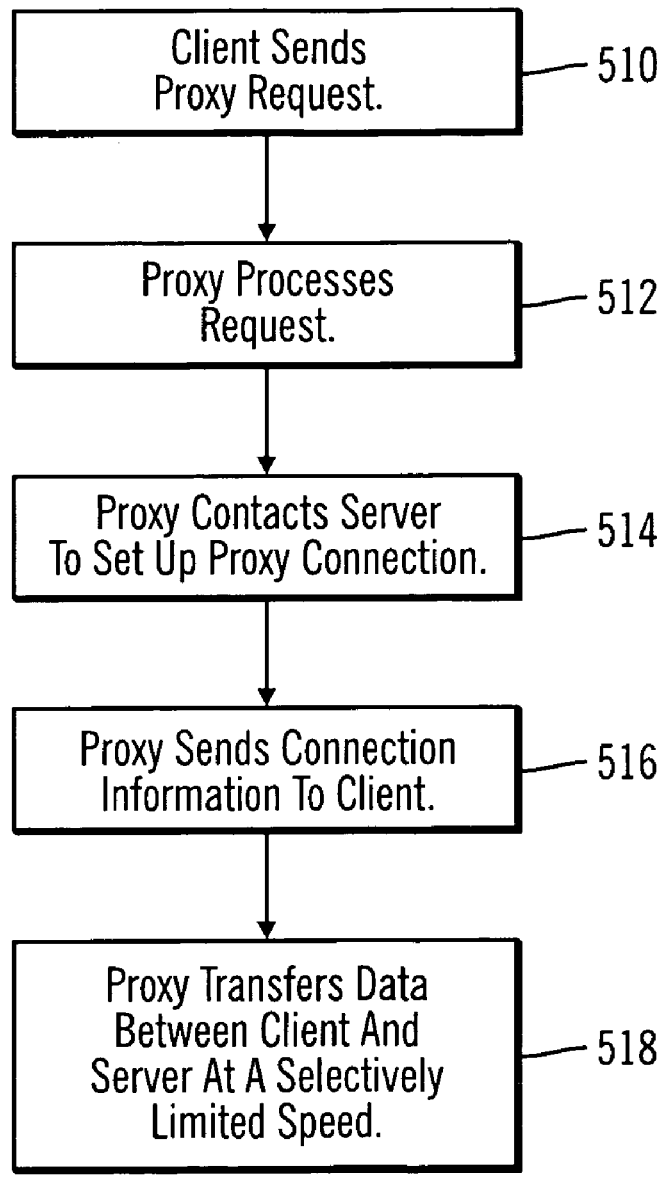
FIG. 3 is a flow chart showing a process for simulating a low-bandwidth connection in accordance with an embodiment of the present invention.

In other words, no changes to an application are required for the application to utilize the connection speed control embedded within the SOCKS server. More specifically, the application to be tested contacts the SOCKS server on port 1080. The SOCKS server transfers the connection to another port and establishes a connection between the network server and the application being tested on the client in the conventional manner. However, the SOCKS server also inserts code to set the connection speed (i.e., the speed control layer) between the application and the network server. FIG. 3 shows a flowchart of the connection and data transfer process.

In the preferred embodiment, the code limits the connection speed by inserting delays in the data path to hold the bytes per second to the selected level. Therefore, even though a network program developer is using a client computer that has a high-bandwidth connection to the network server, the developer can use the speed control layer of the SOCKS server to easily see how the program being developed will be experienced by a user that accesses the program over a low-bandwidth connection. While some embodiments of the invention limit one specific connection to a preset speed, other embodiments have additional features such as support for multiple connections, multiple speeds, and simultaneous simulations at different speeds.

The preferred embodiment of the speed control layer is a Java-based program that transfers data from the network server to a client at about 3K per second by default to simulate a 28.8 kbps modem connection. However, the speed can be adjusted through a GUI to any speed that is less than the actual speed of the network connection (i.e., the high-bandwidth connection). Further, each data stream through the proxy server can be given its own speed and all unslowed data traffic proceeds through the proxy server in the normal manner. Thus, one client computer (e.g., 30) can be used to test a program as if it had a low-bandwidth connection such as 28.8 kbps modem connection, while another client computer (e.g., 34) accesses the same network server at the full speed of its high-bandwidth connection. This allows productivity on the network to be maintained in parallel with any low-bandwidth connection testing. Further, one port on the proxy server is reserved for interfacing with the speed control layer. Through this interface, the desired connection speed can be set for each of the data streams.

In the embodiment of FIG. 2, the proxy server is a stand alone server that makes connections back to the originating network. In other words, the proxy server does not connect two networks together but operates on a single network. Further, embedding the speed control layer in a proxy server allows security-approved conventional network software components to be used.

Accordingly, preferred embodiments of the present invention provide a low-bandwidth environment over a high-bandwidth connection such as a LAN connection. Any connection speed can be set and each connection through the interfacing device can be established at a different speed. Additionally, the low-bandwidth simulation can occur in parallel with full speed access to the same physical device. Further, this can all be accomplished without altering the application being tested or the server device. Thus, a developer can experience a typical user's experience over a low-bandwidth modem connection.

The speed control layer of the present invention can be implemented in hardware, software, or a combination of the two. For example, at least a portion of the speed control layer can be embodied in software programs that are stored on a computer-readable medium (e.g., magnetic disk, optical disk, or non-volatile memory) for execution by a computer. Further, while the embodiments described above relate to a speed control layer embedded in a proxy server, one of ordinary skill in the art could easily embody the speed control layer of the present invention directly in the network server or any other server (e.g., a web server) as a server-side "governor". Similarly, the speed control layer could be embodied in the client as a client-side "governor", and could even be embodied directly in the application being tested.

Additionally, while the embodiments above relate to LAN connections, the speed control layer of the present invention can be used to limit the speed of any type of data transfer connection (e.g., an ISDN line, a T1 line, or a 56 kbps modem connection). In general, the speed control layer of the present invention can be inserted into any data path between any two devices to limit the data transfer rate. For example, the speed control layer could be inserted between a hard drive and system bus to simulate the speed of a floppy or other slower drive. Design choices, such as the type of interface to the speed control layer, the method of slowing and controlling the data transfer rate, and the type of data transfer path being controlled, could also easily be adapted. Furthermore, embodiments of the present invention may not include all of the features described above.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method of simulating a low-bandwidth connection over a higher-bandwidth connection, said method comprising the steps of:
   receiving at a speed control layer data from a first device at a first speed; and
   limiting the maximum data transfer speed of a high-bandwidth connection between the speed control layer and a second device so as to transfer the data from the speed control layer to the second device over the high-bandwidth connection at a second predetermined speed, which is less than the first speed,
   wherein the second device is a client device,
   the high-bandwidth connection is at a third speed, and
   the second predetermined speed at which the data is transferred from the speed control layer to the second device over the high-bandwidth connection is less than the third speed of the high-bandwidth connection.

2. The method as defined in claim 1, wherein in the limiting step, the data is transferred over a high-bandwidth LAN.

3. The method as defined in claim 2, wherein the second predetermined speed is a modem connection speed.

4. The method as defined in claim 1, further comprising the step of:
   before the limiting step, setting the second predetermined speed.

5. The method as defined in claim 4, further comprising the step of changing the second predetermined speed to a fourth predetermined speed, which is also less than the first speed and less than the third speed of the high-bandwidth connection.

6. The method as defined in claim 1, further comprising the steps of:
   receiving second data from the first device at the first speed; and
   limiting the maximum data transfer speed of a high-bandwidth connection between the speed control layer and a third device so as to transfer the second data from the speed control layer to the third device over the high-bandwidth connection at a fifth predetermined speed, which is different than the second predetermined speed, less than the first speed, and less than the third speed of the high-bandwidth connection, wherein the third device is a client device.

7. The method as defined in claim 1, further comprising the steps of:
   receiving second data from the first device at the first speed; and
   limiting the maximum data transfer speed of a high-bandwidth connection between the speed control layer and a third device so as to transfer the second data from the speed control layer to the third device over the high-bandwidth connection at the second predetermined speed,
   wherein the third device is a client device.

8. The method as defined in claim 1, further comprising the steps of:
   receiving second data from the first device at the first speed; and
   limiting the maximum data transfer speed of a high-bandwidth connection between the speed control layer and a third device so as to transfer the second data from the speed control layer to the third device over the high-bandwidth connection at the third speed of the high-bandwidth connection,
   wherein the third device is a client device.

9. A machine-readable medium encoded with a program for simulating a low-bandwidth connection over a higher-bandwidth connection, said program containing instructions for performing the steps of:
   receiving at a speed control layer data from a first device at a first speed; and
   limiting the maximum data transfer speed of a high-bandwidth connection between the speed control layer and a second device so as to transfer the data from the speed control layer to the second device over the high-bandwidth connection at a second predetermined speed, which is less than the first speed,
   wherein the second device is a client device,
   the high-bandwidth connection is at a third speed, and
   the second predetermined speed at which the data is transferred from the speed control layer to the second device over the high-bandwidth connection is less than the third speed of the high-bandwidth connection.

10. The machine-readable medium as defined in claim 9, wherein said program further contains instructions for performing the step of:
    before the limiting step, setting the second predetermined speed.

11. The machine-readable medium as defined in claim 10, wherein said program further contains instructions for performing the step of changing the second predetermined speed to a fourth predetermined speed, which is also less than the first speed and less than the third speed of the high-bandwidth connection.

12. The machine-readable medium as defined in claim 9, wherein said program further contains instructions for performing the steps of:
    receiving second data from the first device at the first speed; and
    limiting the maximum data transfer speed of a high-bandwidth connection between the speed control layer and a third device so as to transfer the second data from the speed control layer to the third device over the high-bandwidth connection at a fifth predetermined speed, which is different than the second predetermined speed, less than the first speed, and less than the third speed of the high-bandwidth connection,
    wherein the third device is a client device.

13. The machine-readable medium as defined in claim 9, wherein said program further contains instructions for performing the steps of:
    receiving second data from the first device at the first speed; and
    limiting the maximum data transfer speed of a high-bandwidth connection between the speed control layer and a third device so as to transfer the second data from the speed control layer to the third device over the high-bandwidth connection at the second predetermined speed,
    wherein the third device is a client device.

14. The machine-readable medium as defined in claim 9, wherein said program further contains instructions for performing the steps of:

receiving second data from the first device at the first speed; and limiting the maximum data transfer speed of a high-bandwidth connection between the speed control layer and a third device so as to transfer the second data from the speed control layer to the third device over the high-bandwidth connection at the third speed of the high-bandwidth connection, wherein the third device is a client device.

15. A computer system comprising:

a first device transferring data at a first speed;

a second device, the second device being a client device; and a speed control layer coupled between the first and second devices, the speed control layer limiting the maximum data transfer speed of a high-bandwidth connection between the speed control layer and the second device so as to transfer data from the first device to the second device over a high-bandwidth connection at a second predetermined speed that is less than the first speed and less than the normal speed of the high-bandwidth connection.

16. The computer system as defined in claim 15, wherein the speed control layer includes an interface that is used to set the second predetermined speed.

17. The computer system as defined in claim 15, further comprising:

a third device coupled to the speed control layer, the third device being a client device, wherein the speed control layer also limits the maximum data transfer speed of a high-bandwidth connection between the speed control layer and the third device so as to transfer data from the first device to the third device at a third predetermined speed which is different from the second predetermined speed.

18. The computer system as defined in claim 15, further comprising:

a third device coupled to the speed control layer, the third device being a client device, wherein the speed control layer also limits the maximum data transfer speed of a high-bandwidth connection between the speed control layer and the third device so as to transfer data from the first device to the third device at the second predetermined speed.

19. The computer system as defined in claim 15, further comprising:

a third device coupled to the speed control layer, the third device being a client device, wherein the speed control layer does not limit the maximum data transfer speed of a high-bandwidth connection between the speed control layer and the third device.

20. A proxy server for transferring data between a server and at least one client computer, said proxy server comprising:

a first interface for transferring data with the server;

a second interface for transferring data with the client computer; and speed control means for limiting the maximum data transfer speed of a high-bandwidth connection between the server and the client computer so as to transfer data from the server to the client computer over a high-bandwidth connection at a first predetermined speed that is less than the normal speed of the high-bandwidth connection.

21. The proxy server as defined in claim 20, wherein the speed control means includes an interface that is used to set the first predetermined speed before the speed control means limits the maximum data transfer speed.

22. The proxy server as defined in claim 20, further comprising:

a third interface for transferring data with a second client computer, wherein the speed control means also limits the maximum data transfer speed of a high-bandwidth connection between the server and the second client computer so as to transfer data from the server to the second client computer over a high-bandwidth connection at a second predetermined speed, which is different than the first predetermined speed and less than the normal speed of the high-bandwidth connection.

23. The proxy server as defined in claim 20, further comprising:

a third interface for transferring data with a second client computer, wherein the speed control means also slows data transfer to the second client computer to the first predetermined speed, wherein the speed control means also limits the maximum data transfer speed of a high-bandwidth connection between the server and the second client computer so as to transfer data from the server to the second client computer over a high-bandwidth connection at the first predetermined speed.

24. The proxy server as defined in claim 20, further comprising:

a third interface for transferring data with a second client computer, wherein the speed control means does not limit the maximum data transfer speed of a high-bandwidth connection between the server and the second client computer.

* * * * *